Sept. 17, 1957        C. D. SWEAT, JR        2,806,459
VARIABLE CONTROL DEVICE FOR TIMING MOTOR VALVES
Filed March 28, 1955        3 Sheets-Sheet 1

INVENTOR.
C. Conly Downing Sweat, Jr.
BY Chas. Denegre
Attorney.

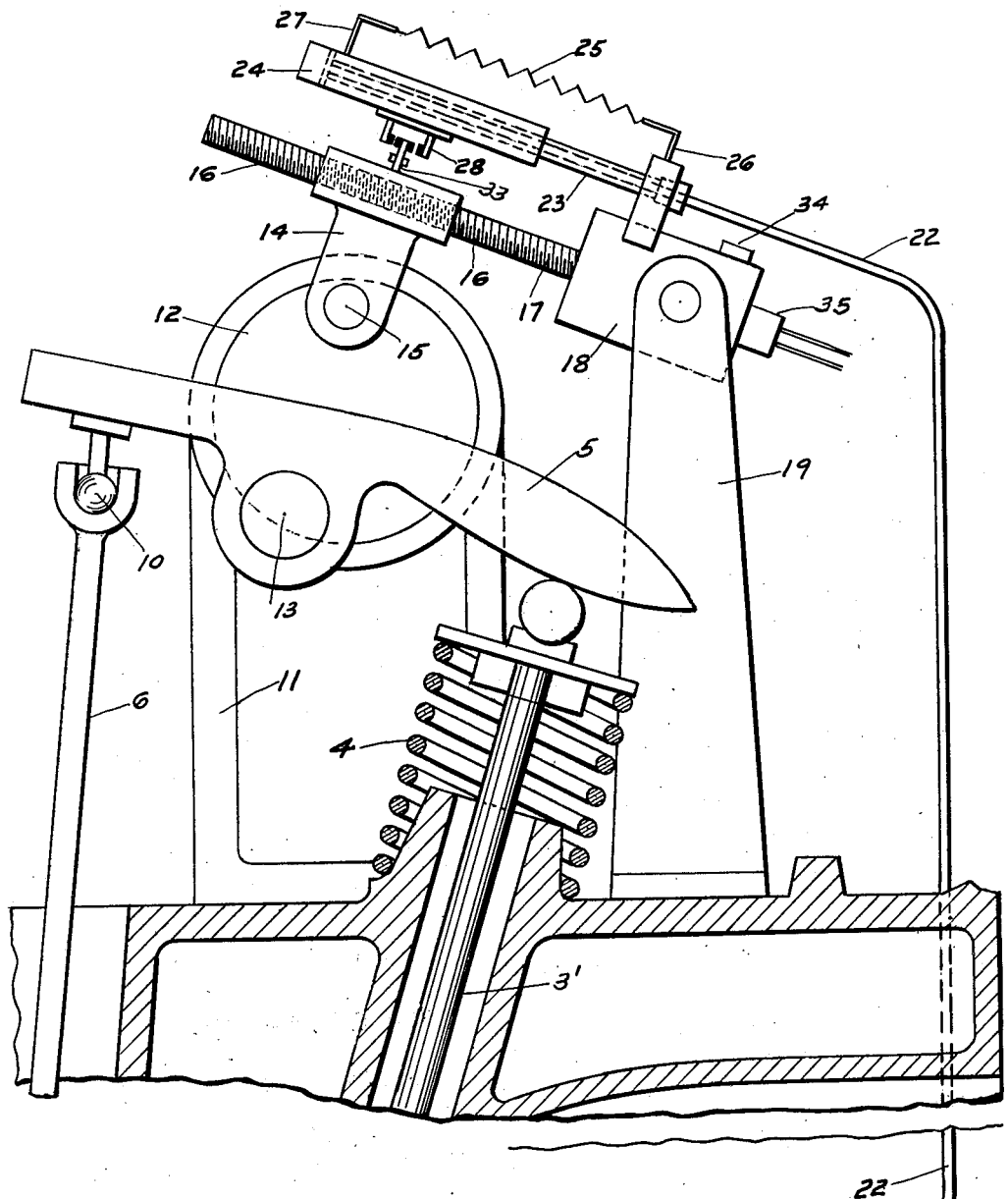
Fig. 2.
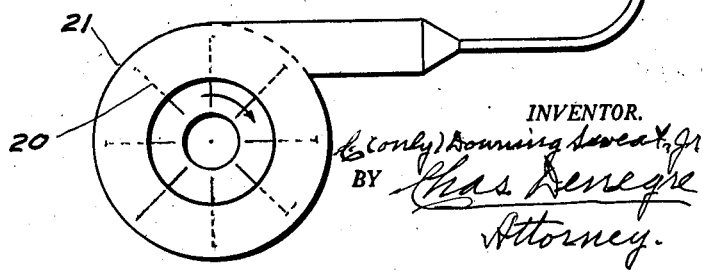
INVENTOR.

Sept. 17, 1957 C. D. SWEAT, JR 2,806,459
VARIABLE CONTROL DEVICE FOR TIMING MOTOR VALVES
Filed March 28, 1955 3 Sheets-Sheet 3

INVENTOR.
Conly Downing Sweat, Jr.
BY Chas. Denegre
Attorney

United States Patent Office

2,806,459
Patented Sept. 17, 1957

2,806,459

VARIABLE CONTROL DEVICE FOR TIMING MOTOR VALVES

C. Downing Sweat, Jr., Huntsville, Ala.

Application March 28, 1955, Serial No. 497,031

2 Claims. (Cl. 123—90)

This invention relates to a control device for motor valves. It is especially intended for use on automobile motors but may be used on other types of motors. It has for its objects to provide such a valve that will be highly satisfactory for the purpose intended, simple in structure, comparatively cheap to manufacture, and extremely durable.

The main object of the invention is to provide an internal combustion motor which will have power, efficiency and smooth operation over a wide range of speeds. To produce a motor which will have a smooth flow of power at idling speed, yet when fuel is supplied to the motor it will reach speeds far greater than the speeds which a present day motor could attain, assuming that the motor was designed to have power at an idling speed.

The two extremes in present day motors are those which have torque at idling speed at approximately 600 R. P. M., but will not run very much faster, and those which have torque at very high speeds approximately 6000 R. P. M., but will not even run at slow speeds. The present invention will provide a motor which will have the good operating qualities of both of the above described motors, that is, power at both low and high speeds.

In an internal combustion motor the valve timing is the key to the amount of power that will be produced for given speeds. With the present invention the motor will have a valve timing that will vary as the speed of the motor varies so as to produce the best possible valve timing at any speed. To accomplish this varying valve timing this invention produces a clearance in the valve chain which varies as the speed of the motor varies. Now, by placing an advanced timing cam shaft in the motor, such will give the motor advanced timing, but only as long as the clearance in the valve chain is small, but as the motor would slow down from a high speed the clearance will get larger and the valve timing would thus be retarded.

Other objects and advantages will appear from the drawings and specification.

Figure 1:
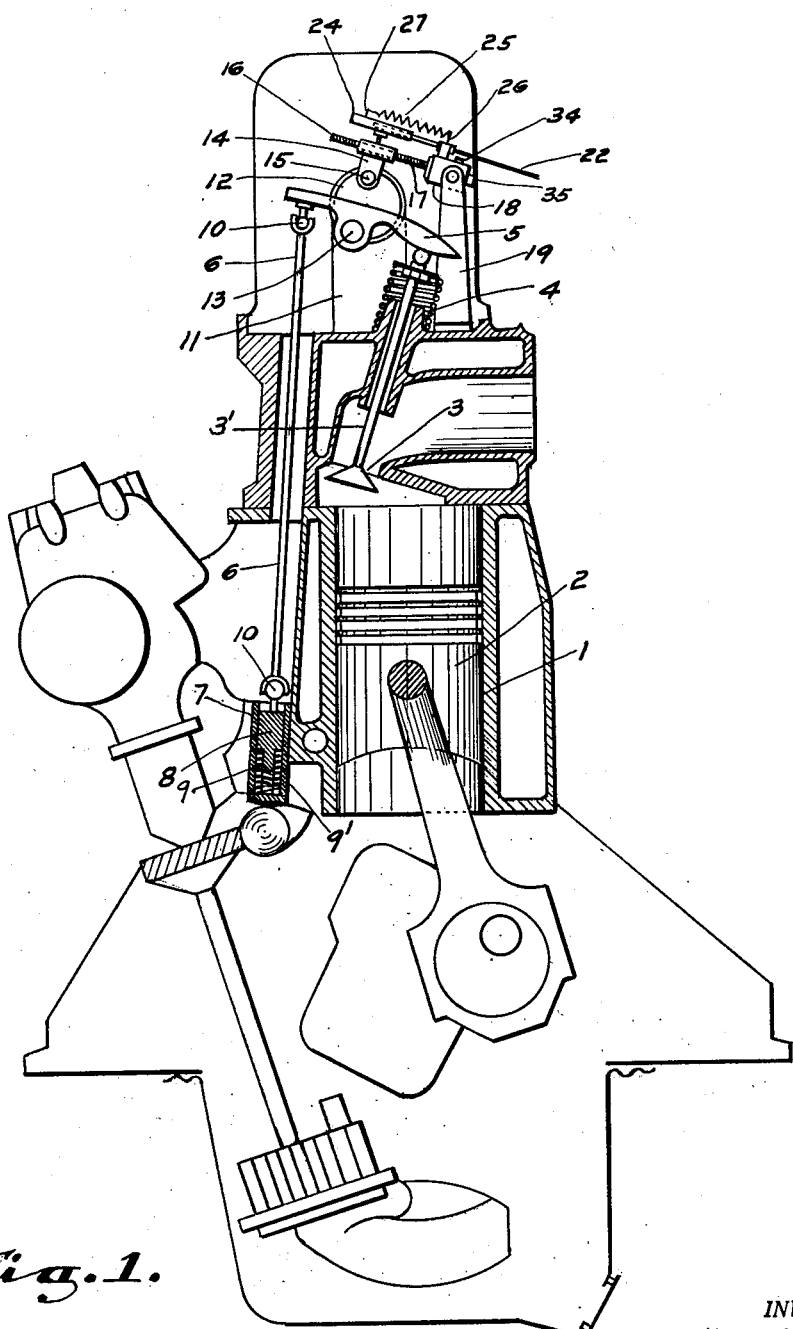
Figure 4:
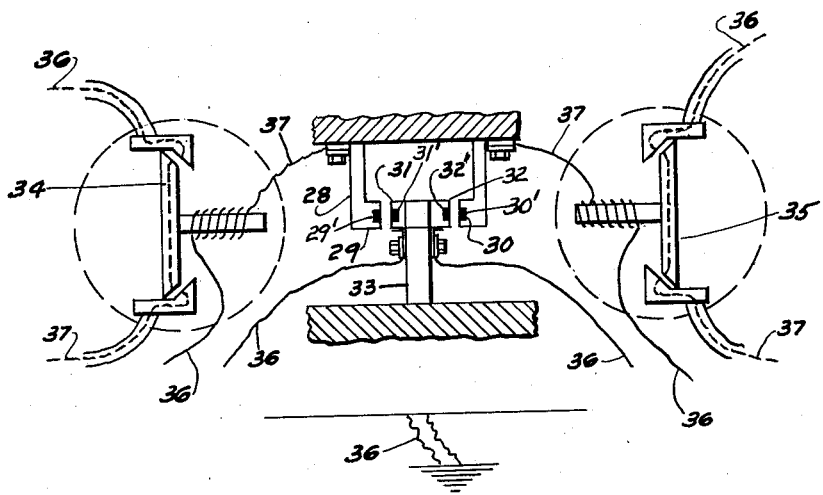
Figure 3:
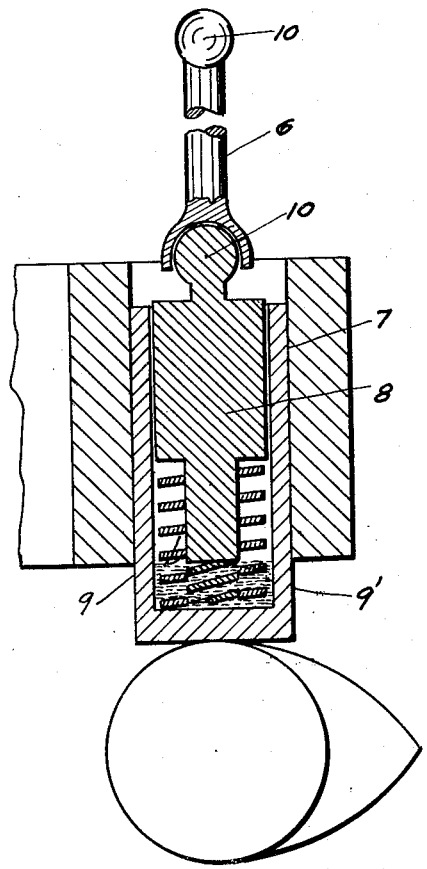

By referring generally to the drawings, a part of this application, it will be observed that Fig. 1 is an elevational view, part full and part in section, of part of an internal combustion motor with the valve control device made according to this invention and mounted in position for use; Fig. 2 is an elevational view enlarged showing the control device in position for use; Fig. 3 is an enlarged detail view showing the push rod assembly in contact with the cam shaft; and Fig. 4 is a diagram showing the electrical control features of the control assembly.

Similar reference numerals refer to similar parts throughout the several views.

Referring to the drawings in detail it will be seen that the valve control mechanism is used in combination with a motor cylinder 1, a piston 2, a valve 3 having a regular spring 4, a rocker arm 5, a push rod 6 provided with a small cylinder 7 having a piston 8 mounted on a spring 9 in the cylinder. The push rod is provided with ball joints 10. A supporting structure 11 is mounted on the top of the cylinder and contains the rocker fulcrum 12 in its rounded portion. The rocker arm is mounted on a stud shaft 13 in the rocker fulcrum. A bracket 14 is mounted on the stud shaft 15 in the rocker fulcrum. The upper portion of the bracket is provided with inner worm gear type threads that fit on the worm gear type threads 16 on the shaft 17 leading from the electric motor 18 mounted on a support 19 attached on the top of the cylinder. The motor controls the position of the rocker fulcrum 12 and thereby regulates the amount of opening of the valve 3. The mechanism includes a fan 20 in a case 21 attached at the front of the motor in any suitable manner. A tube 22 leads from the fan to a piston 23 in a cylinder 24. A coil spring 25 is attached by one end to a bracket 26 on the electric motor with the other end attached to a bracket 27 on the cylinder. The spring is set in tension to pull the cylinder toward the electric motor. The cylinder is provided with a bracket 28 having two electric contact points 29 and 30 adapted for making contact with the two contact points 31 and 32 supported in the bracket 33 on the worm threaded bracket on the motor shaft. The pressure fan produces pressure which increases as the motor R. P. M. increases. This pressure is transferred to the cylinder and piston by the tube. The air pressure forces the cylinder against the spring tension. As the cylinder moves it causes the electrical points to make contact which cause the electric motor to turn and move the lower set of points in the direction in which the cylinder has moved until the points break contact. If the cylinder is moved in either direction it will cause one set of points to make contact. The contacting of either set of electrical points will cause that solenoid 34 or 35 to close that circuit to the motor which will operate clockwise or counter-clockwise. Wires 36 lead to battery indicated by 38. Wires 37 lead to mechanism motor.

From the foregoing it will appear that the control mechanism is operated first by air pressure generated by the fan the speed of which regulates the pressure of the air; then electrical contacts resulting from the movement of the cylinder causes the motor to operate to further control and operate the assembled mechanism. All movement is the result of the speed of the automobile motor and the movement of the rocker fulcrum that produces more or less clearance in the valve operating chain.

The various parts of the mechanism may be made of any material suitable for the purpose. Also the parts may be made in different sizes and capacities.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A variable control device for timing motor valves of the class described comprising part of an automobile motor, a fan mounted in a housing attached to the front of the automobile motor part, a small cylinder and piston mounted on the top of the automobile motor part, a tube leading from the fan to the small cylinder and piston, a small electric motor mounted near said small cylinder and piston, a coil spring attached by its ends to said small cylinder and motor, electric contacts and wires mounted on said cylinder, a rockable fulcrum mounted below said small cylinder, a bracket pivotally attached on said fulcrum, the upper part of said bracket having a hole therethrough and worm gear threads in its inner face, a small shaft leading from said small electric motor, said shaft having worm gear threads on its face and inserted through the bracket having the worm gear threads therein, a stud shaft attached in the rockable fulcrum, a motor valve rocker arm mounted on said shaft in the rockable fulcrum, a motor valve push rod having a cylinder and spring mounted on its lower end with its upper end in contact with the rocker arm on the stud shaft in the rockable fulcrum, a motor valve stem and operating spring therefor, the other end of said valve rocker arm being in contact with the upper end of said valve stem, the clearance in the valve operating chain being adapted for variation as a result of movement to the right or left of said rockable fulcrum under control of said air pressure and electrical contacts.

2. A variable control for valves of an automobile internal combustion motor comprising a crank case and a cylinder and piston and valve and valve rocker arm and valve push rod and cam shaft of the motor in combination with a fan mounted in a housing attached to the front of the automobile motor part, a small cylinder and piston mounted on the top of the automobile motor part, a tube leading from the fan to the small cylinder and piston, a small electric motor mounted near said small cylinder and piston, a coil spring attached by its ends to said small cylinder and motor, electric contacts and wires mounted on said cylinder, a rockable fulcrum mounted below said small cylinder, a bracket pivotally attached on said fulcrum, the upper part of said bracket having a hole therethrough and worm gear threads in its inner face, a small shaft leading from said small electric motor, said shaft having worm gear threads on its face and inserted through the bracket having the worm gear threads therein, a stud shaft attached in the rockable fulcrum, a motor valve rocker arm mounted on said shaft in the rockable fulcrum, a motor valve push rod having a cylinder and spring mounted on its lower end with its upper end in contact with the rocker arm on the stud shaft in the rockable fulcrum, a motor valve stem and operating spring therefor, the other end of said valve rocker arm being in contact with the upper end of said valve stem, the clearance in the valve operating chain being adapted for variation as a result of movement to the right or left of said rockable fulcrum under control of said air pressure and electrical contacts.

References Cited in the file of this patent

UNITED STATES PATENTS

| 903,772 | Reichenbach et al. | Nov. 10, 1908 |
| 2,412,457 | Harrison | Dec. 10, 1946 |

FOREIGN PATENTS

| 25,588 | Great Britain | Jan. 7, 1904 |